US007892997B2

(12) United States Patent  
Cook et al.

(10) Patent No.: US 7,892,997 B2
(45) Date of Patent: Feb. 22, 2011

(54) GLAZE COMPOSITIONS

(75) Inventors: Simon Gregson Cook, Guildford (GB); Miguel Joaquin Galindo Cercos, Benicassim (ES)

(73) Assignee: U.S. Borax Inc., Greenwood Village, CO (US)

( * ) Notice: Subject to any disclaimer, the term of this patent is extended or adjusted under 35 U.S.C. 154(b) by 282 days.

(21) Appl. No.: 12/159,824

(22) PCT Filed: Jun. 21, 2007

(86) PCT No.: PCT/GB2007/002322

§ 371 (c)(1),
(2), (4) Date: Jul. 1, 2008

(87) PCT Pub. No.: WO2007/148101

PCT Pub. Date: Dec. 27, 2007

(65) Prior Publication Data

US 2008/0311302 A1 Dec. 18, 2008

(30) Foreign Application Priority Data

Jun. 21, 2006 (GB) ................................ 0612316.0

(51) Int. Cl.
*C03C 8/00* (2006.01)
*C03C 3/091* (2006.01)
(52) U.S. Cl. ............................... 501/21; 501/14; 501/66
(58) Field of Classification Search .................. 501/14, 501/21, 66
See application file for complete search history.

(56) References Cited

U.S. PATENT DOCUMENTS

| 4,814,298 | A |  | 3/1989 | Nelson et al. |
| 5,304,516 | A |  | 4/1994 | Clifford |
| 5,362,687 | A |  | 11/1994 | Tokunaga |
| 5,447,891 | A |  | 9/1995 | Spinosa et al. |
| 5,677,250 | A |  | 10/1997 | Knapp |
| 6,132,832 | A |  | 10/2000 | Crichton et al. |
| 6,348,425 | B1 | * | 2/2002 | Barattini et al. ............... 501/5 |
| 6,362,119 | B1 |  | 3/2002 | Chiba |
| 6,922,007 | B2 |  | 7/2005 | Geier et al. |

FOREIGN PATENT DOCUMENTS

| EP | 0 202 551 A2 | 11/1986 |
| EP | 0509792 | 10/1992 |
| EP | 0729 923 | 11/1996 |
| EP | 1 867 608 | 12/2007 |
| GB | 895 293 A | 5/1962 |
| GB | 928 453 A | 6/1963 |
| GB | 2 404 379 | 2/2005 |
| JP | 57027942 | 2/1982 |
| JP | 1290556 | 11/1989 |
| JP | 06 211559 A | 8/1994 |
| JP | 08 138911 | 5/1996 |
| JP | 2004107191 | 4/2004 |
| KR | 1981-0000059 | 2/1981 |
| KR | 1989-0006537 | 6/1989 |
| KR | 20040011885 | 2/2004 |
| RU | 1799855 | 3/1993 |
| RU | 2002711 | 11/1993 |
| RU | 2014293 | 6/1994 |
| RU | 2083529 | 7/1997 |
| SU | 389041 | 7/1973 |
| SU | 390 818 A1 | 12/1973 |
| SU | 460262 | 2/1975 |
| SU | 472909 | 6/1975 |
| SU | 478794 | 7/1975 |
| SU | 872 476 B | 10/1981 |
| SU | 872476 | 10/1981 |
| SU | 1033464 | 8/1983 |
| SU | 1044609 | 9/1983 |
| SU | 1154226 | 5/1985 |
| SU | 1175904 | 8/1985 |
| SU | 1248974 | 8/1986 |
| SU | 1418301 | 8/1988 |

(Continued)

OTHER PUBLICATIONS

European Patent Office acting as the International Preliminary Examining Authority, "International Preliminary Report on Patentability," for Int. App No. PCT/GB2007/002322, dated Jan. 21, 2008.

Translated Official Action issued by the Patent Office of the Russian Federation on Nov. 10, 2009 for Russian Application No. 2008131290.

Kartal et al., "Characteristics and Advantages of a "Sinterit" Calcined Raw Material Mixture for Glazes," DKG 79 (2002) No. 3, pp. E16-E20.

(Continued)

*Primary Examiner*—Karl E Group
(74) *Attorney, Agent, or Firm*—Sheridan Ross P.C.

(57) ABSTRACT

This invention relates to boron-containing compositions for use in glaze compositions. There is provided a boron-containing composition for use in glaze production, which composition is obtainable by a process which comprises heating to a temperature sufficiently high that calcination occurs but insufficient for the formation of a homogeneous melt a mixture comprising components capable, under the conditions of heating, of forming the oxides $B_2O_3$, $SiO_2$, $Al_2O_3$, $Na_2O$ and optionally CaO in proportions such that the relative percentages by weight of the said oxides, based on the total weight of the said oxides, are as follows: 10 to 18% $B_2O_3$, 40 to 65% $SiO_2$, 17 to 32% $Al_2O_3$, 4 to 9% $Na_2O$, and 0 to 10% CaO. The boron-containing compositions according to the present invention may be used in glaze compositions, suitably frit-free or boron-free frit-containing glaze compositions.

14 Claims, No Drawings

FOREIGN PATENT DOCUMENTS

| SU | 1544734 | 2/1990 |
|---|---|---|
| SU | 1636360 | 3/1991 |
| SU | 872 476 A1 | 10/1991 |
| SU | 1682334 | 10/1991 |
| SU | 1749194 | 7/1992 |
| WO | WO 99/32282 | 7/1999 |
| WO | WO 01 04065 A | 1/2001 |
| WO | WO 2007/148101 | 12/2007 |
| WO | WO 2009/081137 | 7/2009 |

OTHER PUBLICATIONS

United Kingdom Search Report for Great Britain Application No. GB 0612316.0, dated Oct. 23, 2006.

Hu, et al. Optimization of $MgTiO_3$-$CaTiO_3$ based LTCC tapes containing B2O3 for use in microwave applications *Ceramics International*, Jan. 1, 2005 v.31: pp. 85-93.

Search Report prepared by the UK Patent Office on Apr. 16, 2008 Application No. GB0724905.5.

Search Report prepared by the UK Patent Office on Jul. 28, 2008 Application No. GB0724905.5.

Official Action issued by the European Patent Office on Feb. 25, 2009, for European Application No. 07 733 318.5.

Official Action in Vietnamese and translation of the Official Action issued by the Patent Office of Vietnam on Mar. 5, 2009, for Vietnamese Application No. 1-2008-028046.

International Search Report prepared by the ISA on Aug. 4, 2009 for PCT Application No. PCT/GB2008/004224.

Written Opinion prepared by the ISA on Aug. 4, 2009 for PCT Application No. PCT/GB2008/004224.

Notice of Allowance issued by the European Patent Office on Dec. 14, 2009, for European Application No. 07 733 318.5.

Official Action issued on Dec. 15, 2009 in Egypt for Egyptian Application No. 1325/2008.

International Preliminary Report on Patentability prepared by the ISA on Mar. 12, 2010 for PCT Application No. PCT/GB2008/004224.

Official Action in Russian and translation of the Official Action issued by the Patent Office of the Russian Federation on Apr. 29, 2010, for Russian Application No. 2008131290.

Official Action in Vietnamese and translation of the Official Action issued by the Patent Office of Vietnam on May 27, 2010, for Vietnamese Application No. 1-2008-028046.

Official Action in Korean and translation of the Official Action issued by the Patent Office of Korea on Jun. 8, 2010, for Korean Application No. 10-2009-7016573.

Official Action (including translation) for Chinese Application No. 200780001994.7, mailed Jul. 14, 2010.

Official Action (translation only) for corresponding Ukraine Patent Application No. 200809901, date unknown.

\* cited by examiner

GLAZE COMPOSITIONS

CROSS REFERENCE TO RELATED APPLICATIONS

This application is a national stage application under 35 U.S.C. 371 of PCT Application No. PCT/GB2007/002322 having an international filing date of 21 Jun. 2007, which designated the United States, which PCT application claimed the benefit of United Kingdom Application No. 0612316.0 filed 21 Jun. 2006, the entire disclosure of each of which are hereby incorporated herein by reference.

This invention relates to boron-containing compositions for use in glaze compositions, typically for application to ceramics, particularly ceramic tiles, their preparation and glaze compositions containing them.

Ceramic glaze technology has existed for thousands of years. Items that are glazed today include ceramic tableware, ceramic sanitaryware, heavy clay products such as roof tiles and bricks, ceramic wall and floor tiles. Generally, glazes comprise one or more glass frits as the major component with other raw materials such as clay, in an aqueous medium. The use of frit in glazes is dominated by wall and floor tiles, which probably account for more than 95% of all ceramic frits produced globally at the current time.

Glazes for tableware, heavy clay, and wall/floor tiles typically contain frit. Glazes for sanitaryware however, do not and are usually composed of raw materials only such as clay and other minerals and refined chemicals, all of which are insoluble in water.

Boron has long been recognised as an important component of glaze compositions. With conventional technology, it is only possible to incorporate boron in glazes by inclusion in a frit to render it insoluble. Boron as boric oxide has many beneficial functions in ceramic glazes when added as a frit. For example, it is a flux that does not increase thermal expansion and improves chemical durability. Boric oxide is also a valuable glaze constituent for eliminating the need for hazardous lead oxide in glazes.

The intensity of use of boric oxide in glazes depends on the use of the glaze. In general, the higher the firing temperature for the glaze, the lower the boric oxide content required. In ceramic tiles, boric oxide remains an essential constituent in nearly all types of tile whether they are wall, floor, porous or vitrified. An exception is porcelain tiles as the high firing temperature negates the need for boron in the frit and boron-free frits are commercially available for this application.

Frits are usually prepared on a continuous basis by screw-feeding dry-mixed raw material batch in the appropriate composition ratio, to a furnace where the mixture is melted by being subjected to firing followed by fast cooling in water to obtain a glass. The glass is dried and ground into fine particles to form a glass frit.

The furnace comprises a refractory box supported on stilts, typically with a single gas burner at one end and the raw material feed at the other. The exhaust is normally at the opposite end to the raw material feed. The dimensions of the furnace are small compared to a glass furnace, typical areas are 10 to 12 m$^2$. An alternative to a single burner is to have several small burners along the sides of the furnace. The refractory lining is fused zirconia/alumina and must be replaced every few years.

The combustion system is normally fired by air/gas or oxy/gas. For air/gas the thermal efficiency is lower so the energy consumption is higher. The energy cost is not necessarily higher due to the cost of the oxygen for oxy/gas firing.

The energy consumption depends on the type of furnace (the combustion system and the heat recovery system, if there is one) and the type of frit. Typical values are 290 Nm$^3$ gas per tonne of frit for air/gas and 190 Nm$^3$ gas per tonne of frit for oxy/gas firing. This is equivalent to 3.2 and 2.1 MWh per tonne of frit.

The furnace emits both dust and volatile species. Both are captured in a bag filter that operates at around 200° C. The volatiles condense on cooling and can be captured with the dust. The dust emissions are batch materials that are entrained in the combustion gases, and can have a range of composition. The volatile species are mainly borates, which are volatile above 1200° C., especially in a wet atmosphere. The material from the filter is recycled into the furnace. It is usual to have one filter per furnace. Some plants have one installation for the whole plant but this makes recycling of the dust much more difficult. The alternatives to bag filters are electrostatic precipitators but these are not popular.

The raw material batch for a frit is dry-mixed and transferred to a silo before the furnace by pneumatic conveyor. From there it is screw-fed into the furnace. The mixture masses at one end of the furnace. The mass is kept constant by controlling the feed rate. Other parameters that are controlled are the temperature and pressure in the furnace. The fusion temperature is usually 1450-1500° C. As the mixture melts it forms a thin layer on the bottom of the furnace, 2-10 cm thick, and flows down the furnace where it exits over a weir or through a hole in the furnace floor. Often there is a small burner at this point to keep the melt viscosity low.

The melt is quenched in a water bath to produce a glass. The glass is extracted from the bath by a vibrating belt, dried, ground and transferred as a glass frit to suitable storage facilities.

Frits have many different compositions depending on the desired end use, though most ceramic frit producers have a very similar range of products. Tiles are classified into five categories depending on the materials used to make the body of the tile, and whether the tile is a wall or floor tile. Within each of the five categories, there are different types of frit available to give glossy transparent, glossy white and matt surfaces, for example. Thus, the typical frit manufacturer has an extensive range of products, maybe around 50. Of these, probably ten frits account for 80% of its output, which is destined for glazing wall tiles, and comprise frits having similar compositions. The remainder accounts for the other 20% of volume for all other applications. These require many modifications to formulations.

There are a number of issues that are important for the frit producers in, for example, Europe. There is increasing pressure over emissions from the plant, that may be in the form of either gaseous emissions from furnace exhausts or aqueous emissions from quenching and wash-down water. Particular species that are of concern are $NO_x$, $CO_2$ and B (gaseous and aqueous), for example.

Production costs are relatively high and need to be reduced to compete with low cost countries, such as by reducing energy consumption.

There is also a desire to increase flexibility. For example, typically every time there is a change of composition in production, there are about 5 tonnes of material produced that is of an intermediate composition. These have to be blended with other product.

Glazes for ceramic tiles have several functions. They impart an aesthetically-pleasing aspect, give the porous ceramic body a non-porous coating, give adequate chemical durability, give mechanical durability such as hardness and abrasion resistance, and give slip resistance.

Not all of these benefits are required for all tiles. For example, mechanical durability and slip resistance are not important for wall tiles.

Current glaze recipes vary widely depending on the tile type. In general, as firing temperatures increase the proportion of frit required in the tile glaze decreases and the proportion of raw materials increases. (The proportion of boron in the frit also decreases with increasing firing temperature). Firing temperature increases in the order double-fired wall tiles, red body single-fired wall tiles, white body single-fired wall tiles, red body single-fired floor tiles, white body single-fired floor tiles, porcelain tiles. The maximum firing temperature used for tiles is around 1180-1220° C. for porcelain tiles.

Nearly all glazes are applied wet to the ceramic tile surface, so they are usually produced from frits and raw materials through a wet grinding route. This is normally done in a ball mill, as the size of as-quenched frit particles is too large to allow bead milling. Some sanitaryware glazes are produced by bead milling as in this case all of the raw materials are in powder form.

Glaze is applied by any of a variety of automated methods that may be by spray, spinning disc, rubber roller or waterfall (bell). The most common method is the waterfall or bell method, where tiles move under a curtain of glaze created by flowing the glaze down the outer surface of a metal bell.

The most modern tile technology is single fast firing, in which the ceramic tile body and glaze are fired simultaneously. Typical cycles are well under one hour in length, from cold to cold, with only a few minutes at maximum temperature. Slightly older technology is double fast firing, in which the tile body is fired once before the glaze is applied, and the body/glaze combination is then fired a second time. This technology is less energy and labour-efficient than single firing and hence has been in decline since the development of single firing.

Frits are used in glazes to render the desired soluble elements sodium, potassium and boron insoluble in water. They need to be insoluble since soluble elements will migrate during drying processes that give rise to glaze defects as well as the possibility of effluent problems as they would be present in wastewaters. The frit also ensures that the melting process commences at an early stage, that is before the glaze firing process itself. This ensures that high gloss in the glaze firing process is easily obtained.

Alternatives to frits have been sought. These must exhibit essentially the same properties as a frit to make them useful in glaze compositions. The material must be low in solubility, in particular boron solubility. If not, it will not be as desirable as a frit as defects in the glaze would likely result as well as soluble boron being unwanted for effluent reasons. It must also give a good glaze result on firing and must not be too refractory to melt during the glaze firing process.

Glazes that do not contain frits are known. A Kartal in cfi/Ber. DKG 79 (2002) No. 3, describes methods for replacing frits for floor tile glazes with a calcined natural boron compound like colemanite. The calcined colemanite is also recommended as a partial replacement of frit for wall tile glazes, particularly for single fired wall tiles. However the composition obtained according to this reference has an aqueous solubility of boron that is significantly higher than a frit and thus limits the use of such compositions.

JP 57027942 describes a glaze comprising commercial waste glass with the addition of ulexite so as to give a slurry. Ulexite is a mineral comprising 5-10 wt % sodium oxide, 10-20 wt % calcium oxide and 40-50 wt % boric oxide.

According to a first aspect of the present invention there is provided a boron-containing composition for use in glaze production, which composition is obtainable by a process which comprises heating to a temperature sufficiently high that calcination occurs but insufficient for formation of a homogeneous melt, suitably to a temperature of 750 to 1300° C., a mixture comprising components capable, under the conditions of heating, of forming the oxides $B_2O_3$, $SiO_2$, $Al_2O_3$, $Na_2O$ and optionally CaO in proportions such that the relative percentages by weight of the said oxides, based on the total weight of the said oxides, is as follows:

10 to 18% $B_2O_3$
40 to 65% $SiO_2$
17 to 32% $Al_2O_3$
4 to 9% $Na_2O$, and
0 to 10% CaO.

The boron-containing compositions according to the invention can be used in frit-free glaze compositions to provide boron-containing glazes with low boron solubility for general use in glazing compositions.

The boron-containing compositions according to the invention can be used in frit-free glaze compositions having excellent gloss and durability meeting the requirements of traditional glaze compositions.

The boron-containing compositions according to the invention can be used in the glazing of ceramic articles with frit-free glaze compositions that meet the criteria of conventional frit-containing glaze compositions.

The boron-containing compositions according to the invention can be used in total or partial replacement of frits in glaze compositions.

It has surprisingly been found that the boron-containing compositions according to the invention can be used in frit-free glaze compositions which provide glazes having a boron solubility as low as that of boron-containing frits and much lower than previously described frit-free compositions.

According to a second aspect of the invention, there is provided a glaze composition, suitably a frit-free or boron-free frit containing glaze composition, containing a boron-containing composition according to the invention.

According to another aspect of the invention, there is provided the use of a boron-containing composition according to the invention in a glaze composition, suitably a frit-free or boron-free frit-containing glaze composition.

According to a further aspect of the invention, there is provided a process for preparing a boron-containing composition for use in a glaze composition, which process comprises heating, to a temperature sufficiently high that calcination occurs but insufficient for formation of a homogeneous melt, suitably to a temperature of 750 to 1300° C., a composition in particulate form comprising a mixture of components capable, under the conditions of heating, of yielding the oxides $B_2O_3$, $SiO_2$, $Al_2O_3$, $Na_2O$, and optionally CaO in proportions such that the relative percentages by weight of the said oxides, based on the total weight of the said oxides, is as follows:

10 to 18% $B_2O_3$
40 to 65% $SiO_2$
17 to 32% $Al_2O_3$
4 to 9% $Na_2O$ and
0 to 10% CaO, and then comminuting the resulting composition.

According to a yet further aspect of the invention there is provided a method of glazing a ceramic article which method comprises applying to a surface of the ceramic article a glaze composition according to the invention, and firing the ceramic article.

The invention also provides a ceramic article glazed by the method according to the invention.

The raw materials do not form an homogeneous melt on heating. This in particular contrasts with the production of frits which involve melting to form homogeneous glasses. Accordingly the boron-containing compositions according to the present invention can be manufactured at lower temperatures, and thus at less cost, than frits.

Further, problems associated with boron emissions from frit furnaces may be substantially eliminated according to the invention. The calcination temperature may be typically 500° C. lower than a typical frit fusion temperature, and the calcination time is around 70% shorter than that for frit manufacture. This gives a very significant reduction in the energy required to produce a ceramic glaze without affecting the energy required to fire the glaze, i.e. the glazing process is essentially the same for both conventional frit-containing glazes and those according to the invention.

The cost of glazes containing the compositions according to the invention is typically lower than for conventional fritted glazes. This is because the amount of the calcined composition in the glaze is generally lower than the amount of frit required in conventional glazes. The overall cost of the calcined composition may also be lower than the cost of a frit, depending on the composition of the frit.

Raw materials used according to the present invention form $B_2O_3$, $SiO_2$, $Al_2O_3$, $Na_2O$ and optionally CaO under the calcinations conditions. Most suitably there may be used a mixture of sodium borate which acts as a source of $B_2O_3$ and $Na_2O$, kaolin, which acts as a source of $Al_2O_3$ and $SiO_2$, quartz, which acts a source of $SiO_2$, and optionally wollastonite, which acts as a source of CaO.

The preferred proportions of these raw materials, by weight, based on the total weight of these ingredients, are as follows:

|  | Preferred Range | Particularly Preferred |
|---|---|---|
| Sodium borate | 10-30% | 20% |
| Quartz | 20-30% | 25% |
| Kaolin | 40-50% | 45% |
| Wollastonite | 7.5-15% | 10% |

Other materials may be used to obtain the desired oxide content of the boron-containing compositions as may be useful for certain applications.

Each of the ingredients of the composition serves particular functions.

Boron gives a strong fluxing action in the calcination process and in the glaze firing process. The boron compound must be used in powder form in order to obtain good mixing before calcination. Of the sodium borates, sodium tetraborate pentahydrate (borax pentahydrate), commercially available under the brand name Neobor®, is preferred. Borax decahydrate can also be used but is not as cost-effective as borax pentahydrate. Non-sodium borates such as boric acid, boric oxide and colemanite are free from sodium oxide and hence not as suitable for this application as sodium borates unless they are augmented with sodium from an alternative source that on heating will be equivalent to the desired oxide definition. A suitable such material is soda ash. The mineral ulexite is a sodium-calcium borate and is suitable for use, but again it is less cost effective than borax pentahydrate.

Silica ($SiO_2$) gives some glassy phase during calcination by reaction with the borate and any wollastonite. If silica is not employed then the resulting composition would have a desired low water solubility, although it would be too refractory for use as a glaze constituent. The particle size of the preferred quartz is important. If it is too large it does not react sufficiently during calcination, which gives rise to undissolved quartz particles in the calcined compositions. These in turn give rise to low glaze gloss since they do not dissolve in the glaze during firing. The preferred particle size for quartz as used in this invention is <400 mesh ($D_{50}$ 11 µm) e.g. Millisil C400 from Sifraco, Paris. Alternatives to quartz are other finely ground materials rich in silica but they should suitably also be low in iron, titanium and other colouring oxides to minimise colouring of the final glaze. These may be, for example, feldspar, feldspathic sand or waste materials such as ground float or container glass cullet (transparent, not coloured).

Kaolin is the preferred material to provide alumina ($Al_2O_3$) to impart low water solubility to the boron-containing compositions of the invention. It also supplies part of the $SiO_2$ component. Without it the water solubility of the compositions would be usually significantly higher than a ceramic frit thus rendering them unsuitable for glaze applications. The quality of the kaolin (proportion of colouring oxides present as impurities) is important and must be high, in order to minimise yellowing of the glaze. Kaolin is used as a powder. The principal function of kaolin is to provide $Al_2O_3$ but there are suitable alternatives being other powdered materials rich in $Al_2O_3$ and low in iron, titanium and other colouring oxides to minimise undesired colouring in the finished glaze. These are, for example feldspar, kyanite/andalusite/sillimanite (all $Al_2O_3.SiO_2$), mullite ($2Al_2O_3.2SiO_2$), calcined alumina ($Al_2O_3$), and alumina trihydrate ($Al(OH)_3$).

In general, kaolin gives good results and is the most economical way to add alumina. However all kaolins, no matter how "clean" and high in quality, contain some colouring oxides as impurities such as $Fe_2O_3$ and $TiO_2$. The oxides can impart a slight yellow colour to some glazes formulated with the calcined material, reducing the glaze quality. In such cases, when it is necessary to partially or wholly replace kaolin in the formulation with alumina, thus avoiding the addition of colouring oxides, additional quartz will be required. This has an impact on the raw materials cost, which increases.

Wollastonite provides a preferred source of calcium oxide (CaO) to react with borate and quartz in a glassy phase. The presence of CaO has a marked effect on the calcination temperature, reducing it by around 100° C. It also reduces the refractoriness of the calcined borate when it is used in a glaze, resulting in a higher gloss. Other forms of CaO for example burnt lime (CaO), calcium hydroxide ($Ca(OH)_2$) and limestone ($CaCO_3$) may be used but are less suitable as they give rise to gas emissions during the calcination process. Wollastonite is typically used as a powder having a particle size of less than 75 µm.

The heating of the raw materials is to a temperature sufficiently high to achieve calcination, whereby water and carbon dioxide are driven off. The temperature however is not so high as to result in the mixture becoming molten. The mixed raw materials, in finely divided form, are typically heated to a temperature of 750 to 1300° C., preferably 1050 to 1250° C., for typically 90 minutes. In the event that temperatures towards the higher end of the range may be used, shorter heating times may be employed. Under the heating conditions there may be some interaction between the oxides formed and the product may be generally partly crystalline and partly glassy. The nature of this interaction is however not fully understood.

The boron-containing compositions according to the invention are prepared by heating to a temperature sufficiently high that calcination occurs but insufficient for formation of a homogenous melt, suitably to a temperature of 750 to 1300° C. This gives a material which has a boron solubility as low as that of a boron-containing frit, which is surprising since full melting of the composition is not used, and it is generally accepted that to render boron insoluble it is necessary to fully melt a boron-containing frit or glass composition.

The preparation method for the composition according to the invention makes deliberate use of a low temperature eutectic in the $Na_2O.B_2O_3.SiO_2$.system (see G. W. Morey, J. Soc. Glass. Tech., 35, 270 (1051), the content of which is incorporated herein by reference).

The eutectic occurs at a temperature of 577° C., and when heating mixtures containing $Na_2O$, $B_2O_3$ and $SiO_2$ reaction will start at this temperature, forming some glassy material. On further heating the glassy material will start to dissolve some $Al_2O_3$ from the other raw materials which will increase its durability, in other words decrease its solubility in water. This is the mechanism through which the boron-containing compositions according to the invention are produced with a low solubility of boron. It is nevertheless surprising that the boron solubility is as low as has been measured.

Typically the boron-containing glaze components of the invention may be made by first dry mixing the finely divided raw materials. Water is added slowly until the materials form a crumb. The crumb is dried at 100° C. until all water has been removed. For small-scale production, calcination may be carried out by placing the dried crumb in a suitable receptacle, such as a fireclay crucible, and firing it in a furnace, typically an electric muffle furnace. A typical heating cycle is 10° C. per minute up to the selected temperature, of generally 1050 to 1250° C. It is held at this temperature for approximately 90 minutes and then allowed to cool naturally on switching off the furnace to complete the calcination step.

After the heat treatment the material is removed from the receptacle and crushed carefully. In view of the hardness of the material, it is protected from any metal parts to avoid contamination that may lead to glaze defects.

The appearance of the material obtained is distinct from a ceramic frit. A ceramic frit is nearly always transparent, often with a slight blue or green tinge due to the presence of some colouring impurities. The material according to the invention is opaque, typically a creamy-white colour, sometimes with a pink tinge (depending on the composition).

For large-scale preparations, the raw materials are granulated with water but then calcined by suitable means such as a continuous rotary calciner. This method ensures that the particles do not adhere to each other during calcination, thus removing the need for a crushing step before comminution.

Preferred boron-containing glaze components according to the invention comprise the following by weight:

|  |  | Preferred | Particularly preferred |
| --- | --- | --- | --- |
| (i) | $SiO_2$ | 50-65% | 60.5% |
| (ii) | $Al_2O_3$ | 17-24% | 19% |
| (iii) | $B_2O_3$ | 10-13% | 10.5% |
| (iv) | CaO | 4-7% | 5% |
| (v) | $Na_2O$ | 5-7% | 5% |

The balance is generally made up of impurities comprising less than 1% of any of $Fe_2O_3$, MgO, $K_2O$ and $TiO_2$, and less than 0.1% of $ZrO_2$, BaO, PbO, $P_2O_5$ and SrO of the total composition.

The boron-containing compositions according to the present invention may be used in frit-free glaze compositions. Alternatively the glaze compositions according to the present invention may contain frits, particularly boron-free frits, in addition to the boron-containing glaze compositions according to the present invention.

Glazes according to the present invention normally comprise the glaze component according to the present invention, an optional frit component, clay and all other minor amounts of additives, dispersed in water forming a slurry.

Typically, for glazing, a glaze composition according to the invention in the form of a slurry, having a solids content of between 65 and 70%, is coated on a pressed and dried green body, and the coated ceramic body is fired at a temperature of between 1100 and 1200° C. Ceramic bodies which may be glazed according to the present invention include wall tiles and floor tiles and these may be, according to the composition of the glazed used, be provided with a glossy, matt or satin appearance.

The glaze compositions of the invention can also be applied to engobes. An engobe is an opaque coating that is often applied to the tile body before glazing. Its function is to mask the tile body, for example, when it is produced using red clay. Engobes conventionally contain frits and raw materials but the frit content is typically much lower than in a glaze.

It is possible to produce a range of glazes for floor tiles for example, with a single boron-containing composition according to the invention. This is achieved by modifying the proportions of the other ingredients used in the glaze. This is not possible to the same degree with frits. Hence, it is possible to replace some or many frit compositions with a single composition according to the invention.

The visual appearances of glazes achieved with the composition according to the present invention are very similar to those achieved with conventional frit-based glazes.

The invention is illustrated further by reference to the following examples:

EXAMPLE 1

Finely divided sodium tetrahydrate pentahydrate (Neobor ex Borax Europe Limited 80 g), quartz (100 g), kaolin (180 g) and wollastonite (40 g) were dry mixed in a small mixer stirred at low speed. Water was added slowly through a syringe until the mixture formed a crumb. The crumb was heated at 100° C. until it was completely dry. The dried product was transferred to a fireclay crucible and placed in an electric muffle furnace. The furnace was heated at a rate of 10° C. per minute up to a maximum of 1050° C. where the temperature was held for 90 minutes. The furnace was then switched off and the crucible was allowed to cool to ambient temperature in the furnace.

The product was removed, wrapped in a plastic film and broken up with a hammer.

The resulting composition was opaque with a creamy-white colour and in particulate form.

EXAMPLES 2-4

The method of Example 1 was followed using raw material mixtures having the following compositions, and conditions:

| Example | Neobor (g) | Quartz (g) | Kaolin (g) | Wollastonite (g) | Temperature (° C.) |
|---|---|---|---|---|---|
| 2 | 104 | 58 | 188 | 50 | 1050 |
| 3 | 120 |  | 280 |  | 1250 |
| 4 | 100 | 80 | 220 |  | 1150 |

The resulting compositions were similar in appearance to those of Example 1.

The proportions of the raw materials used in Examples 1 to 4 were such that the percentages by weight of the oxides formed were as follows.

| Example | $B_2O_3$ (%) | $SiO_2$ (%) | $Al_2O_3$ (%) | $Na_2O$ (%) | CaO (%) |
|---|---|---|---|---|---|
| 1 | 10.5 | 60.5 | 19 | 5 | 5 |
| 2 | 13 | 51 | 20 | 6.6 | 7 |
| 3 | 17 | 41 | 31 | 8 | — |
| 4 | 13 | 54 | 24 | 6.6 | — |

The remainder to 100% in each case was made up of impurities.

EXAMPLES 5-14

The compositions obtained in Example 1 to 4 were formulated into glaze compositions which were applied to ceramic wall tiles and fired.

Glaze characterisation tests were then carried out.

Comparative tests using conventional frit-containing glaze compositions were carried out in each of Examples 5 to 11. The comparative results demonstrate that the glazes according to the invention are substantially identical in visual appearance to conventional glazes containing boron frits. Additionally, their other properties such as durability, are essentially the same thus making them very suitable alternatives for use on ceramic substrates such as tiles and other ceramics.

The conditions of the glazing method and characterisation tests were as follows:

Glazing Method

Formulation of Glaze Composition

The ingredients were milled in a laboratory fast jar mill, using alumina grinding balls. The wet method was used (with water) using a slurry solids content of 70%. In addition, the glaze contained a carboxymethylcellulose binder and a sodium tripolyphosphate deflocculant, both of which were added to the water before milling at 0.3% relative to the glaze solids. The glaze was milled until there was less than 1% residue on a standard 40 μm sieve.

Application

The glaze composition was applied to ceramic wall tiles using a modified paint film applicator. The applicator had a 0.6 mm wide slot through which the glaze flowed. The applicator speed and slot width were selected to ensure a glaze deposit dry weight in g/m² similar to those in industrial applications. Typically 600 to 800 g/m² was obtained.

Firing

Glaze firing was carried out in an electric laboratory furnace, using a heating and cooling rate of 25° C. per minute, with 6 minutes at maximum temperature.

Glaze Characterisation Tests

Glaze Colour

This was measured using a spectrophotometer and the CIElab coordinate system.

In the results:

| 'L' = | white/black |
|---|---|
| 100 = | white |
| 'a' = | red/green, positive = red |
| 'b' = | yellow/blue, positive = yellow |

Gloss

Gloss was measured using a 60° gloss meter.

Glaze Sealing Temperature

This is the temperature above which the glaze is not gas permeable. It is important as if the sealing temperature is too low, glaze defects can result due to trapped gas. Sealing temperature was measured by firing the glaze as normal, but by varying the maximum temperature in 10° C. intervals. The fired glazes were examined using a dye penetration test to determine whether they were sealed. In this way the sealing temperature can be specified as a 10° C. range.

Heating Microscope Parameters

Sintering, softening, sphere, half-sphere and fusion point were all measured using a heating microscope. The sample was prepared from milled and dried glaze, by pressing in a small manual die. A drop of water was used to bind the sample, which was in the form of a cylinder 3 mm in height and 2 mm in diameter. The sample was introduced into the microscope, heated at a constant rate (typically 25° C. per minute), and images were recorded in silhouette by a computer. At the end of the heating cycle the images were automatically processed using image analysis, to determine the five parameters.

Chemical Reactivity/durability

These tests were done in accordance with standard UNE-EN ISO 10545-13.1.

The surface of the glaze tile was wiped with acid or alkali solution and marked (with permanent marker or pencil). It was then observed whether removal of the marking left any visible effect.

GHB—indicates there are no visible effects when a permanent marker has been used GHA—indicated there are no visible effects when a pencil has been used.

EXAMPLE 5

Glaze compositions were prepared from the specified ingredients and applied to wall tiles having an engobe and fired at 1100° C. to provide a matt finish. Heating microscope and chemical reactivity/durability tests as well as gloss and colour measurements were carried out.

| Ingredient | Conventional glaze (comparative) (g) | Glaze according to invention (g) |
|---|---|---|
| Kaolin | 8 | 8 |
| Product of Example 1 |  | 28.6 |
| Soda feldspar | 30 | 30 |
| Wollastonite |  | 41.4 |
| Conventional boron frit | 70 |  |
| Total | 108 | 108 |

The results of the glaze characterisation tests were as follows:

| Glaze colour and gloss | | |
|---|---|---|
| L | 92.3 | 91.1 |
| a | −0.49 | −0.74 |
| b | 5.18 | 6.53 |
| Gloss (%) | 51 | 16 |

| Heating microscope properties | | |
|---|---|---|
| Start of contraction (° C.) | 860 | 955 |
| End of contraction (° C.) | 1020 | 1100 |
| Softening point (° C.) | 1115 | 1125 |
| Sphere point (° C.) | 1130 | 1150 |
| Half sphere point (° C.) | 1170 | 1180 |
| Fusion point (° C.) | 1205 | 1210 |

| Chemical reactivity | | |
|---|---|---|
| Hydrochloric acid 18% | GHB | GHB |
| Lactic acid 5% | GHA | GHB |
| Potassium hydroxide 100 g/l | GHA | GHA |

EXAMPLE 6

Glaze compositions were prepared from the specified ingredients, applied to red body floor tiles (with and without engobe), and fired at 1140° C. The resulting glazes had a glossy finish.

| Ingredient | Conventional glaze (comparative) (g) | Glaze according to the invention (g) |
|---|---|---|
| Kaolin | 7 | 8 |
| Product of Example 1 |  | 30 |
| Quartz | 19 |  |
| Zinc oxide |  | 5 |
| Zircosil 5* | 10 | 8 |
| Nepheline syenite | 9 |  |
| Soda feldspar | 17 | 57 |
| Conventional boron frit | 38 |  |
| Total | 100 | 108 |

*Zircosil 5 is a zircon opacifier ex-Johnson Matthey.

The results of the glaze characterisation tests were as follows:

| Glaze colour and gloss | | |
|---|---|---|
| Tile without engobe | | |
| L | 85.6 | 84.5 |
| a | −0.01 | −0.41 |
| b | −0.76 | 0.06 |
| Gloss (%) | 68 | 78 |
| Tile with engobe | | |
| L | 91.9 | 91.0 |
| a | −0.23 | −0.70 |
| b | 1.75 | 3.56 |
| Gloss (%) | 63 | 84 |

EXAMPLE 7

Glaze compositions were prepared from the specified ingredients, applied to red body floor tiles (without engobe), and fired at 1140° C. The resulting glazes had a satin finish.

| Ingredient | Conventional glaze (comparative) (g) | Glaze according to the invention (g) |
|---|---|---|
| Kaolin | 8 | 8 |
| Product of Example 1 |  | 30 |
| Wollastonite |  | 14 |
| Zinc oxide |  | 10 |
| Alumina |  | 8 |
| Nepheline syenite | 9 |  |
| Soda feldspar | 12 | 38 |
| Conventional boron frit | 70 |  |
| Total | 99 | 108 |

| Glaze colour and gloss | | |
|---|---|---|
| L | 74.0 | 67.9 |
| a | 0.61 | 0.87 |
| b | 2.09 | 3.58 |
| Gloss (%) | 14 | 10 |

EXAMPLE 8

Glaze compositions were prepared from the specified ingredients, applied to red body floor tiles (with and without engobe), and fired at 1140° C. The resulting glazes had a matt finish.

| Ingredient | Conventional glaze (comparative) (g) | Glaze according to the invention (g) |
|---|---|---|
| Kaolin | 5 | 8 |
| Product of Example 1 |  | 30 |
| Quartz | 4 |  |
| Zinc oxide | 2 |  |
| Alumina | 12 |  |
| Zircosil 5 | 7 | 3 |

-continued

| Ingredient | Conventional glaze (comparative) (g) | Glaze according to the invention (g) |
|---|---|---|
| Nepheline syenite | 12 | |
| Soda feldspar | 14 | 67 |
| Wollastonite | 19 | |
| Conventional boron frit | 24 | |
| Total | 99 | 108 |

The results of the glaze characterisation tests were as follows:

| Glaze colour and gloss | | |
|---|---|---|
| Tile without engobe | | |
| L | 76.5 | 75.5 |
| a | 0.05 | 0.85 |
| b | 0.76 | 1.68 |
| Gloss (%) | 4 | 4 |
| Tile with engobe | | |
| L | 89.6 | 88.0 |
| a | 0.82 | −1.01 |
| b | 2.39 | 4.66 |
| Gloss (%) | 8 | 3 |

EXAMPLE 9

Glaze compositions were prepared from the specified ingredients, applied to porcelain tiles (with and without engobe), and fired at 1180° C. The resulting glazes had a glossy finish.

| Ingredient | Conventional glaze (comparative) (g) | Glaze according to the invention (g) |
|---|---|---|
| Kaolin | 6 | 8 |
| Product of Example 1 | | 30 |
| Quartz | 16 | |
| Zinc oxide | 0.5 | |
| Alumina | 4 | |
| Zircosil 5 | 9 | 3 |
| Soda feldspar | | 67 |
| Conventional boron frit | 64 | |
| Total | 99.5 | 108 |

The results of the glaze characterisation tests were as follows:

| Glaze colour and gloss | | |
|---|---|---|
| Tile without engobe | | |
| L | 88.4 | 88.2 |
| a | 0.32 | 0.06 |
| b | 3.77 | 4.13 |
| Gloss (%) | 93 | 94 |
| Tile with engobe | | |
| L | 93.3 | 91.4 |
| a | 0.46 | 0.40 |
| b | 3.15 | 3.16 |
| Gloss (%) | 95 | 94 |

EXAMPLE 10

Glaze compositions were prepared from the specified ingredients, applied to porcelain tiles (with and without engobe), and fired at 1180° C. The resulting glazes had a satin finish.

| Ingredients | Conventional glaze (comparative) (g) | Glaze according to the invention (g) |
|---|---|---|
| Kaolin | 6 | 8 |
| Product of Example 1 | | 30 |
| Zinc oxide | | 6 |
| Alumina | 3 | 6 |
| Zircosil 5 | | 3 |
| Soda feldspar | 9 | 45 |
| Wollastonite | | 10 |
| Conventional boron frit | 72 | |
| Total | 100 | 108 |

The results of the glaze characterisation tests were as follows:

| Glaze colour and gloss | | |
|---|---|---|
| Tile without engobe | | |
| L | 85.2 | 85.5 |
| a | 0.42 | 0.23 |
| b | 6.92 | 7.42 |
| Gloss (%) | 11 | 17 |
| Tile with engobe | | |
| L | 92.0 | 91.3 |
| a | −0.43 | 0.37 |
| b | 3.61 | 4.7 |
| Gloss (%) | 10 | 15 |

EXAMPLE 11

Glaze compositions were prepared from the specified ingredients, applied to porcelain tiles (without engobe), and fired at 1180° C. The resulting glazes had a matt finish.

| Ingredient | Conventional glaze (comparative) (g) | Glaze according to the invention (g) |
|---|---|---|
| Kaolin | 5 | 8 |
| Product of Example 1 | | 30 |
| Quartz | 4 | |
| Zinc oxide | 2 | |
| Alumina | 12 | 3 |
| Zircosil 5 | 7 | 7 |

-continued

| Ingredient | Conventional glaze (comparative) (g) | Glaze according to the invention (g) |
|---|---|---|
| Nepheline syenite | 12 | |
| Soda feldspar | 14 | 50 |
| Wollastonite | 19 | 10 |
| Conventional boron frit | 24 | |
| Total | 99 | 108 |

The results of the glaze characterisation tests were as follows:

| Glaze colour and gloss | | |
|---|---|---|
| L | 85.9 | 88.0 |
| a | 0.08 | 0.07 |
| b | 5.92 | 5.02 |
| Gloss (%) | 7 | 14 |

EXAMPLE 12

Six different glaze compositions were prepared using the product of Example 2 using the ingredients specified below.

Each glaze composition was applied to a wall tile, fired at two different firing temperatures as specified below and the gloss levels measured.

| Ingredient Product of | Glaze formulation (g) | | | | | |
|---|---|---|---|---|---|---|
| Example 2 | 92 | 73.6 | 73.6 | 82.8 | 82.8 | 82.8 |
| Spodumene | | 18.4 | | | | |
| Quartz | | | 18.4 | | | |
| Zinc oxide | | | | 9.2 | | |
| Alumina | | | | | 9.2 | |
| Zircosil 5 | | | | | | 9.2 |
| Kaolin | 8 | 8 | 8 | 8 | 8 | 8 |
| Gloss @ 1180° C. | 89 | 91 | 76 | 95 | 91 | 92 |
| Gloss @ 1100° C. | 83 | 81 | 77 | 95 | 85 | 90 |

These results show that the product of Example 2 can be used to easily produce glazes with a range of gloss levels.

EXAMPLE 13

This example compares a conventional boron-containing frit containing glaze composition with a boron free frit containing glaze composition according to the invention.

The boron-free frit used was made by conventional means from the following raw materials (% by weight):

| | |
|---|---|
| $BaCO_3$ | 5.8 |
| $CaCO_3$ | 25.4 |
| $KNO_3$ | 6.0 |
| Quartz | 53.8 |
| ZnO | 8.9 |

The resulting boron-free frit had an oxide composition (% by weight) as follows:

| | |
|---|---|
| BaO | 5.3 |
| CaO | 16.8 |
| $K_2O$ | 3.4 |
| $SiO_2$ | 63.4 |
| ZnO | 10.6. |

Small amounts of impurities making up the last 0.5% were derived from $Al_2O_3$, MgO, $Na_2O$ and SrO.

Glaze compositions having the compositions below were applied to wall tiles (without engobe), and fired at 1100-1120° C. High gloss transparent glazes were obtained.

| Ingredient | Conventional glaze (comparative) (g) | Glaze according to the invention (g) |
|---|---|---|
| Kaolin | 8 | 8 |
| Product of Example 3 | | 18.5 |
| Boron-free frit | | 73.5 |
| Conventional boron frit | 92 | |
| Total | 100 | 100 |

The results of the glaze characterisation tests carried out were as follows:

| Glaze colour and gloss | | |
|---|---|---|
| L | 89.5 | 89.1 |
| a | −0.51 | −0.62 |
| b | 3.58 | 2.81 |
| Gloss @ 1120° C. (%) | 98 | 97 |

| Glaze sealing temperature | | |
|---|---|---|
| Sealing temperature (° C.) | 940-950° C. | 940-950° C. |

| Heating microscope properties | | |
|---|---|---|
| Start of contraction (° C.) | 820 | 820 |
| End of contraction (° C.) | 970 | 1070 |
| Softening point (° C.) | 1030 | 1080 |
| Sphere point (° C.) | 1100 | 1120 |
| Half sphere point (° C.) | 1240 | 1210 |
| Fusion point (° C.) | 1270 | 1260 |

The results show that, although the melting behaviour shown by the heating microscope was different, the fired result for the glaze according to the invention was very similar to that of the conventional one in terms of gloss and colour.

The product of Example 3 has also been used without frit to produce a matt glaze for porcelain tiles fired at 1180° C. Though in view of its relatively high melting temperature, it is generally suitable for use in fritted glazes or for matt glazes to be fired at higher temperatures i.e. 1180° C. or above.

EXAMPLE 14

The example also comprises a conventional boron-containing frit containing glaze composition with a boron-free frit containing glaze composition according to the invention based here on the product of Example 4.

The boron-free frit used was made by conventional means from the following raw materials (% by weight):

| | |
|---|---|
| $BaCO_3$ | 6.2 |
| $CaCO_3$ | 26.6 |
| $KNO_3$ | 6.5 |
| Quartz | 51.3 |
| ZnO | 9.4. |

The resulting boron-free frit had an oxide composition (% by weight) as follows:

| | |
|---|---|
| BaO | 5.7 |
| CaO | 17.8 |
| $K_2O$ | 3.7 |
| $SiO_2$ | 61.0 |
| ZnO | 11.3. |

Small amounts of impurities making up the last 0.5% were derived from $Al_2O_3$, MgO, $Na_2O$ and SrO.

Glaze compositions having the composition below are applied to wall tiles (without engobe) and fired at 1100-1120° C. High gloss transparent glazes were obtained.

| Ingredient | Conventional glaze (comparative) (g) | Glaze according to the invention (g) |
|---|---|---|
| Kaolin | 8 | 8 |
| Product of Example 4 | | 23.2 |
| Boron-free frit | | 68.8 |
| Conventional boron frit | 92 | |
| Total | 100 | 100 |

The resulting of the glaze characterisation tests carried out were as follows

| Glaze gloss | | |
|---|---|---|
| Gloss at 1100° C. (%) | 98 | 91 |

| Glaze sealing temperature | | |
|---|---|---|
| Sealing temperature (° C.) | 940-950° C. | 900-910° C. |

| Heating microscope properties | | |
|---|---|---|
| Start of contraction (° C.) | 820 | 770 |
| End of contraction (° C.) | 970 | 970 |
| Softening point (° C.) | 1030 | Irregular shape |
| Sphere point (° C.) | 1100 | 1150 |
| Half sphere point (° C.) | 1240 | 1180 |
| Fusion point (° C.) | 1270 | 1200 |

The results show that product of Example 4 was inferior to that of Example 3 in terms of glaze appearance. The glaze composition did, however, exhibit similar properties to tiles coated with a conventional glaze.

The invention claimed is:

1. A frit-free, comminuted boron-containing composition for use in glaze production, which composition is obtained by a process which comprises heating to a temperature sufficiently high that calcination occurs but insufficient for the formation of a homogeneous melt a mixture comprising components capable, under the conditions of heating, of forming the oxides $B_2O_3$, $SiO_2$, $Al_2O_3$, $Na_2O$ and optionally CaO in proportions such that the relative percentages by weight of the said oxides, based on the total weight of the said oxides, are as follows:
   10 to 18% $B_2O_3$
   40 to 65% $SiO_2$
   17 to 32% $Al_2O_3$
   4 to 9% $Na_2O$, and
   0 to 10% CaO, and
   then comminuting the resulting composition.

2. A composition according to claim 1, in which the said proportions of the said oxides are as follows:
   10 to 13% $B_2O_3$
   50 to 65% $SiO_2$
   17 to 24% $Al_2O_3$
   5 to 7% $Na_2O$, and
   4 to 7% CaO.

3. A composition according to claim 1, in which there are used as starting materials, by weight, based on the total weight of these ingredients:
   Sodium borate 10- 30%
   Quartz 20-30%
   Kaolin 30-50%
   Wollastonite 7.5-15%.

4. A composition according to claim 1, in which the said mixture is heated to 1050 to 1250° C.

5. A process for preparing a boron-containing composition for use in a glaze composition, which process comprises heating to a temperature sufficiently high that calcination occurs but insufficient for the formation of a homogeneous melt a composition in particulate form comprising a mixture of components capable, under the conditions of heating, of yielding the oxides $B_2O_3$, $SiO_2$, $Al_2O_3$, $Na_2O$, and optionally CaO in proportions such that the relative percentages by weight of the said oxides, based on the total weight of the said oxides, are as follows:
   10 to 18% $B_2O_3$
   40 to 65% $SiO_2$
   17to 32% $Al_2O_3$
   4 to 9% $Na_2O$ and
   0 to 10% CaO, and
   then, comminuting the resulting composition.

6. A process according to claim 5, in which the said proportions of the said oxides are as follows:
- 10 to 13% $B_2O_3$
- 50 to 65% $SiO_2$
- 17 to 24% $Al_2O_3$
- 5 to 7% $Na_2O$, and
- 4 to 7% CaO.

7. A process according to claim 5, in which there are used as starting materials, by weight, based on the total weight of these ingredients:
- Sodium borate 10-30%
- Quartz 20-30%
- Kaolin 30-50%
- Wollastonite 7.5-15%.

8. A process according to claim 5, in which the said mixture is heated to 1050 to 1250° C.

9. A boron-containing composition for use in glaze production prepared by the process claimed in claim 5.

10. A glaze composition which comprises a boron-containing composition as claimed in claim 1.

11. A glaze composition according to claim 10, which also contains boron-free frit.

12. A method of glazing a ceramic article which method comprise applying to the surface of the ceramic article a glaze composition as claimed in claim 10, and firing the ceramic article.

13. A process according to claim 6, in which there are used as starting materials, by weight, based on the total weight of these ingredients:
- Sodium borate 10-30%
- Quartz 20-30%
- Kaolin 30-50%
- Wollastonite 7.5-15%.

14. A method of glazing a ceramic article which method comprise applying to the surface of the ceramic article a glaze composition as claimed in claim 11, and firing the ceramic article.

* * * * *